(12) United States Patent
Sakuta et al.

(10) Patent No.: US 9,640,296 B2
(45) Date of Patent: May 2, 2017

(54) ELECTROCONDUCTIVE POLYMER DISPERSION LIQUID AND ELECTROCONDUCTIVE COATING

(71) Applicant: SHIN-ETSU POLYMER CO., LTD., Tokyo (JP)

(72) Inventors: Toshihide Sakuta, Saitama (JP); Kazuyoshi Yoshida, Kazo (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 0 days.

(21) Appl. No.: 14/889,407

(22) PCT Filed: May 20, 2014

(86) PCT No.: PCT/JP2014/063315
§ 371 (c)(1),
(2) Date: Nov. 5, 2015

(87) PCT Pub. No.: WO2014/189036
PCT Pub. Date: Nov. 27, 2014

(65) Prior Publication Data
US 2016/0086684 A1 Mar. 24, 2016

(30) Foreign Application Priority Data

May 21, 2013 (JP) ................................ 2013-106981

(51) Int. Cl.
*H01B 1/00* (2006.01)
*H01B 1/12* (2006.01)
*C09D 4/00* (2006.01)
*C08K 5/5455* (2006.01)
*C08L 101/12* (2006.01)
*C09D 5/24* (2006.01)

(52) U.S. Cl.
CPC ........... *H01B 1/127* (2013.01); *C08K 5/5455* (2013.01); *C08L 101/12* (2013.01); *C09D 4/00* (2013.01); *C09D 5/24* (2013.01); *H01B 1/122* (2013.01); *H01B 1/128* (2013.01)

(58) Field of Classification Search
CPC ....... C08K 5/5455; C08L 101/12; C09D 4/00; C09D 5/24; H01B 1/122; H01B 1/127; H01B 1/12
See application file for complete search history.

(56) References Cited

U.S. PATENT DOCUMENTS

| | | | | |
|---|---|---|---|---|
| 7,666,326 B2 * | 2/2010 | Yoshida | .................... | C08K 5/34 252/500 |
| 7,683,109 B2 * | 3/2010 | Yoshida | ............... | C08G 61/124 361/516 |
| 7,842,196 B2 * | 11/2010 | Yoshida | .................. | C08L 65/00 252/500 |
| 7,916,455 B2 * | 3/2011 | Yoshida | ............... | C08G 61/124 361/516 |
| 8,012,591 B2 * | 9/2011 | Tanaka | .................... | C03C 17/28 428/426 |
| 8,472,165 B2 * | 6/2013 | Ning | ........................ | C09D 5/24 252/62.2 |
| 2011/0000658 A1 * | 1/2011 | Tanaka | .................. | C08F 220/56 165/185 |

FOREIGN PATENT DOCUMENTS

| | | |
|---|---|---|
| JP | 06-510316 | 3/1993 |
| JP | 2636968 B2 | 8/1997 |
| JP | 2008-133415 A | 6/2008 |
| JP | 2010-077187 A | 4/2010 |
| JP | 2010-087401 A | 4/2010 |
| JP | 2010-168445 A | 8/2010 |
| JP | 4689222 B2 | 5/2011 |
| JP | 2011-150818 A | 8/2011 |
| JP | 2012-097227 A | 5/2012 |
| JP | 2013191279 A | 9/2013 |
| TW | 201127918 A | 8/2011 |
| WO | WO 2007091656 A1 * | 8/2007 ............... C09D 5/24 |

OTHER PUBLICATIONS

International Search Report in corresponding PCT/JP2014/063315, dated Jul. 1, 2014.
Office Action in corresponding Taiwanese Application No. 103117740, dated Aug. 7, 2015.

* cited by examiner

*Primary Examiner* — Mark Kopec
*Assistant Examiner* — Jaison Thomas
(74) *Attorney, Agent, or Firm* — Lando & Anastasi, LLP

(57) ABSTRACT

The present invention relates to an electroconductive polymer dispersion liquid characterized in containing a π-conjugated electrically conductive polymer, a polyanion, a compound represented by the following chemical formula (1), and a dispersion medium. In accordance with the present invention, an electroconductive polymer dispersion liquid capable of readily forming an electroconductive coating having excellent electrical conductivity, heat resistance, moist-heat resistance, and substrate adhesion property can be provided.

[Chemical formula 1]

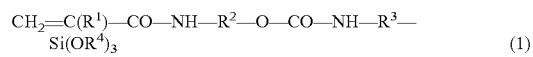

In chemical formula (1), $R^1$ represents a hydrogen atom or a methyl group, $R^2$ and $R^3$ each independently represent an arbitrary substituent group, and $R^4$ represents a methyl group or an ethyl group.

16 Claims, No Drawings

ELECTROCONDUCTIVE POLYMER DISPERSION LIQUID AND ELECTROCONDUCTIVE COATING

CROSS-REFERENCE TO RELATED APPLICATIONS

This application is a U.S. national stage application and claims the benefit under 35 U.S.C. §371 of PCT/JP2014/063315, titled ELECTROCONDUCTIVE POLYMER DISPERSION LIQUID AND ELECTROCONDUCTIVE COATING, filed May 20, 2014, which claims priority to Japanese Patent Application No. 2013-106981, filed May 21, 2013, titled ELECTROCONDUCTIVE POLYMER DISPERSION LIQUID AND ELECTROCONDUCTIVE COATING, which patent applications are hereby incorporated herein by reference in their entireties for all purposes.

TECHNICAL FIELD

The present invention relates to an electroconductive polymer dispersion liquid containing a π-conjugated electrically conductive polymer and an electroconductive coating.

BACKGROUND ART

Recently, products in which a π-conjugated electrically conductive polymer such as polypyrrole, polythiophene and polyaniline is used as an antistatic agent, a transparent conductive film or an electrode of a capacitor are developed.

Generally, a π-conjugated electrically conductive polymer in which the main chain is composed with a conjugated system containing π electrons is an insoluble solid powder even when a dopant is doped to the polymer. Consequently, it is difficult to uniformly form a coating containing a π-conjugated electrically conductive polymer on the surface of a substrate by applying the polymer.

A method in which a π-conjugated electrically conductive polymer is coordinated with a polyanion so that the polymer can be dispersed in solvent to apply the polymer on a substrate is proposed.

For example, in Patent Document 1, in order to increase dispersity in water, a method in which dispersion liquid of poly(3,4-dialkoxythiophene) can be obtained by chemical oxidative polymerization of 3,4-dialkoxythiophene using an oxidant in the presence of polystyrenesulfonate having a molecular weight of 2,000 to 500,000.

However, the electroconductive coating formed from the dispersion liquid described in Patent Document 1 has a problem in that electrical conductivity, heat resistance, moist-heat resistance, and substrate adhesion property are inadequate.

To solve the problem, the present inventors propose a method in which a specific compound for forming a cross-linking point is contained in the dispersion liquid (Patent Document 2).

PRIOR ART DOCUMENTS

Patent Documents

[Patent Document 1] Japanese Patent Publication No. 2636968
[Patent Document 2] Japanese Patent Publication No. 4689222

DISCLOSURE OF THE INVENTION

Problems to be Solved by the Invention

Recently, properties required for a π-conjugated electrically conductive polymer or an electroconductive coating including the polymer are enhanced. Even the electroconductive polymer dispersion liquid described in Patent Document 2 is difficult to fulfill the required properties. For example, although an electroconductive coatings having excellent electrical conductivity, heat resistance, moist-heat resistance, and substrate adhesion property is required, an electroconductive polymer dispersion liquid to form such a coating is not known.

The present invention has an object to provide an electroconductive polymer dispersion liquid capable of readily forming an electroconductive coating having excellent electrical conductivity, heat resistance, moist-heat resistance, and substrate adhesion property.

In addition, the present invention has an object to provide an electroconductive coating having excellent electrical conductivity, heat resistance, moist-heat resistance, and substrate adhesion property.

Means for Solving the Problems

The present invention includes the following embodiments.

[1] An electroconductive polymer dispersion liquid including a π-conjugated electrically conductive polymer, a polyanion, a compound represented by the following chemical formula (1), and a dispersion medium;
in chemical formula (1), $R^1$ represents a hydrogen atom or a methyl group, $R^2$ and $R^3$ each independently represent an arbitrary substituent group, and $R^4$ represents a methyl group or an ethyl group.

[Chemical Formula 1]

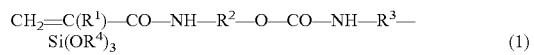

$$CH_2=C(R^1)-CO-NH-R^2-O-CO-NH-R^3-Si(OR^4)_3 \quad (1)$$

[2] The electroconductive polymer dispersion liquid according to [1], further including a binder resin.
[3] An electroconductive coating formed by applying the electroconductive polymer dispersion liquid of [1] or [2].

That is, the present invention includes the following aspects.

<1> An electroconductive polymer dispersion liquid including a π-conjugated electrically conductive polymer, a polyanion, a compound represented by the chemical formula (1), and a dispersion medium.
<2> The electroconductive polymer dispersion liquid according to <1>, wherein the π-conjugated electrically conductive polymer and the polyanion form a complex.
<3> The electroconductive polymer dispersion liquid according to <1> or <2>, further including a binder resin.
<4> An electroconductive coating formed from the electroconductive polymer dispersion liquid of any one of <1> to <3>.

Effects of the Invention

According to the electroconductive polymer dispersion liquid of the present invention, an electroconductive coating having excellent electrical conductivity, heat resistance, moist-heat resistance, and substrate adhesion property can be readily formed.

An electroconductive coating of the present invention has excellent electrical conductivity, heat resistance, moist-heat resistance, and substrate adhesion property.

MODE FOR CARRYING OUT THE INVENTION

<Electroconductive Polymer Dispersion Liquid>

In one aspect of the present invention, an electroconductive polymer dispersion liquid includes a π-conjugated electrically conductive polymer, a polyanion, a compound represented by the chemical formula (1) (hereinafter referred to as "compound 1"), and a dispersion medium.

In one aspect of the present invention, the "electroconductive polymer dispersion liquid" is a material in which at least one of the aforementioned components is floated or suspended in the dispersion.

In one aspect of the present invention, the term "excellent heat resistance" means that the properties of the coating are not changed even in high temperature condition or the change ratio is within the range not to substantially affect the properties of the coating. Here, high temperature condition is the temperature range from 60 to 90° C. In addition, the term "properties of coating" means the surface resistivity, adhesion property to a substrate and total light transmittance. The term "range not to substantially affect" means that the change ratio of the properties is within the range of −20 to +20%. Specifically, the evaluation can be conducted in accordance with heat resistance test as described later.

In one aspect of the present invention, "excellent moist-heat resistance" means that the properties of coating are not changed even in the moist-heat condition or the change ratio is within the range not to substantially affect the properties of the coating. Here, "moist-heat condition" is at a temperature of 40 to 90° C. and humidity of 80 to 95% RH. Specifically, the evaluation can be conducted in accordance with moist-heat resistance test as described later.

In one aspect of the present invention, "excellent electrical conductivity" means that the surface resistivity of the electroconductive coating is 600 Ω/sq or less.

In one aspect of the present invention, "excellent substance adhesion property" means that the coating laminated on a substrate described later is not peeled or slightly peeled. The term "slightly peeled" means that, when the adhesion surface is divided into 100 pieces in a rectangular pattern, the pieces peeled is 10/100 or less. Specifically, the evaluation can be conducted in accordance with adhesion test as described later.

[π-Conjugated Electrically Conductive Polymer]

The π-conjugated electrically conductive polymer is an organic polymer in which the main chain is composed with a π-conjugated system, and examples thereof include polypyrroles, polythiophenes, polyacetylenes, polyphenylenes, polyphenylenevinylenes, polyanilines, polyacenes, polythiophenevinylenes and copolymers thereof. Among these, polythiophenes, polypyrroles, and polyanilines are preferable from the viewpoint of ease in polymerization and stability in air. In terms of solubility in solvent and transparency, polythiophenes are preferable.

Specific examples of polythophenes include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) or poly(3-methyl-4-carboxybutylthiophene).

Examples of polypyrroles include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of polyanilines include polyaniline, poly(2-methylaniline), poly(3-isobutylaniline), poly(2-aniline sulfonic acid) and poly(3-aniline sulfonic acid).

Among the aforementioned π-conjugated electrically conductive polymers, poly(3,4-ethylenedioxythiophene) is preferable from the viewpoints of electrical conductivity, transparency and heat resistance.

[Polyanion]

The polyanion refers to a polymer having a structural unit having an anion group. The anion group of this polyanion functions as a dopant for the π-conjugated electrically conductive polymer, and improves the electrical conductivity of the π-conjugated electrically conductive polymer.

In the present invention, the polyanion is preferably a polymer having two or more anion groups in the molecule thereof. Examples of the anion group include sulfo group or carboxyl group.

Specific examples of the polyanion include polystyrene sulfonate, polyvinylsulfonate, polyallylsulfonate, polyacrylsulfonate, polymethacrylsulfonate, poly(2-acrylamido-2-methylpropanesulfonate), polyisoprene sulfonate, polysulfoethyl methacrylate, poly(4-sulfobutylmethacrylate), polymethacryloxybenzene sulfonate, polyvinyl carboxylate, polystyrene carboxylate, polyallylcarboxylate, polyacrylcarboxylate, polymethacrylcarboxylate, poly(2-acrylamide-2-methylpropanecarboxylate), polyisoprene carboxylate and polyacrylic acid. These may be homopolymers or copolymers of two or more types thereof. Polyanions having a sulfonate group are most preferable.

In one embodiment of the present invention, the degree of polymerization of the polyanion is preferably such that the number of monomer units is within the range of 10 to 100,000, and more preferably within the range of 50 to 10,000, from the viewpoints of dispersibility and electrical conductivity. The degree of polymerization means number average degree of polymerization, and is determined by [number average molecular weight]/[molecular weight of the structural unit] (theoretical value). The number average molecular weight can be determined according to GPC (Gel Permeation Chromatography).

In one embodiment of the present invention, the amount of the polyanion in the electroconductive polymer dispersion liquid is preferably within the range of 0.1 moles to 10 moles, and more preferably within the range of 1 mole to 7 moles, with respect to 1 mole of the π-conjugated electrically conductive polymer. If the content of the polyanion is less than the aforementioned lower limit value, the doping effect on the π-conjugated electrically conductive polymer tends to weaken, thereby resulting in a shortage of electrical conductivity. Moreover, since dispersibility and solubility become low, it becomes difficult to obtain a uniform dispersion liquid. In addition, if the content of the polyanion exceeds the aforementioned upper limit value, the content of the π-conjugated electrically conductive polymer decreases, thereby making it difficult to obtain adequate electrical conductivity.

When the amount of the polyanion in the electroconductive polymer dispersion liquid is 0.1 to 10 moles with respect to 1 mole of the π-conjugated electrically conductive polymer, the doping effect on the π-conjugated electrically conductive polymer is not deteriorated, and uniform dispersion liquid can be obtained.

In the present invention, a polyanion coordinates to a π-conjugated electrically conductive polymer. Consequently, the π-conjugated electrically conductive polymer and the polyanion form an electroconductive complex in the electroconductive polymer dispersion liquid.

Not all anion groups in the polyanion dope the π-conjugated electrically conductive polymer, and surplus anion groups are present. Since these surplus anion groups are hydrophilic groups, they fulfill the role of improving water dispersibility of the aforementioned complex. That is, in one aspect of the present invention, it is preferable that at least part of anion groups within the polyanion coordinates with the π-conjugated electrically conductive polymer.

The amount of the electroconductive complex (formed by a π-conjugated electrically conductive polymer and a polyanion) in the electroconductive polymer dispersion liquid is preferably 0.05 to 5.0% by mass, more preferably 0.1 to 4.0% by mass, and particularly preferably 1.0 to 2.0% by mass, with respect to the total amount of the electroconductive polymer dispersion liquid. When the amount of the electroconductive complex is less than 0.05% by mass, adequate electrical conductivity may not be obtained. When the amount of the electroconductive complex is greater than 5.0% by mass, uniform electroconductive coating may not be obtained.

The amount of the electroconductive complex can be calculated based on the charged amount of raw materials.

In one aspect of the present invention, the average particle diameter of the electroconductive complex in the electroconductive polymer dispersion liquid is preferably 10 to 1,000 nm, and more preferably 10 to 500 nm. The average particle diameter is measured in accordance with dynamic light scattering method (as a measurement apparatus, FPAR1000 manufactured by Otsuka Electronics can be used).

(Compound 1)

$R^1$ in the chemical formula (1) which represents a compound 1 is a hydrogen atom or a methyl group. $R^2$ and $R^3$ are arbitrary substituents. The arbitrary substituents are not particularly limited as long as the substituent is a divalent substituent which does not affect the effect of the present invention. Examples include an alkylene group having 1 to 6 carbon atoms (e.g., a methylene group, an ethylene group, a trimethylene group or a propylene group), an arylene group having 6 to 10 carbon atoms (e.g., a phenylene group, a trylene group, a xylene group or a naphthylene group), an aralkylene group having 7 to 10 carbon atoms (e.g., benzylene group, 1-phenethylene group or 2-phenethylene group). From the viewpoint of raw material availability, an alkylene group having 1 to 4 carbon atoms is preferred. $R^4$ is a methyl group or an ethyl group. $R^2$ represents a divalent group which bonds to N and O in the chemical formula (1). $R^3$ is a divalent a group which bonds N and Si in the chemical formula (1).

The molecular weight of the compound 1 is preferably 100 to 500, and more preferably 247 to 391. When the molecular weight of the compound 1 is no more than the upper limit, solubility in a dispersion medium is enhanced. In one aspect of the present invention, as a compound 1, a compound in which $R^1$ is a hydrogen atom or a methyl group, $R^2$ is a methylene group, an ethylene group or a trimethylene group, $R^3$ is a trimethylene group, and $R^4$ is a methyl group is preferable.

In one aspect of the present invention, as a compound 1, a compound in which $R^1$ is a hydrogen atom or a methyl group, $R^2$ and $R^3$ is a phenylene group, $R^4$ is a methyl group or an ethyl group is preferable.

The amount of the compound 1 in an electroconductive polymer dispersion liquid with respect to 100 parts by mass of the electroconductive complex is preferably 0.01 to 300 parts by mass, more preferably 1 to 200 parts by mass, and particularly preferably 10 to 100 parts by mass. When the amount of the compound 1 is less than the lower limit, effects such as high electrical conductivity, improved heat resistance, improved moist-heat resistance, and improved substrate adhesion property are less likely to be achieved. When the amount of the compound is greater than the upper limit, the concentration of the π-conjugated electrically conductive polymer becomes low, and electrical conductivity tends to be deteriorated.

As a production method to readily obtain the compound 1, a method in which a (meth)acrylamide compound having a hydroxyl group or an acrylamide compound having a hydroxyl group is reacted with an alkoxysilane compound having an isocyanate group can be mentioned. By reacting the hydroxyl group and the isocyanate group, a compound 1 can be produced.

Specifically, it is preferable that 0.8 to 1.2 mole of an alkoxysilane compound having an isocyanate group is reacted with 1 mole of a (meth)acrylamide having a hydroxyl group.

Examples of a (meth)acrylamide having a hydroxyl group include N-hydroxymethylacrylamide, N-hydroxymethylmethacrylamide, N-(2-hydroxyethyl)acryl amide, N-(2-hydroxyethyl)methacrylamide, 2-hydroxypropylacrylamide, and N-(2-hydroxypropyl)methacrylamide.

A silane coupling agent having an isocyanate group, that is, an alkoxysilane compound having an isocyanate group is not particularly limited as long as the effect of the present invention can be achieved.

Specifically, γ-isocyanatopropyltrimethoxysilane, γ-isocyanatopropyltriethoxysilane, γ-isocyanatopropylmethyldimethoxysilane, and γ-isocyanatopropylmethyldiethoxysilane can be mentioned.

As a commercially available silane coupling agent having an isocyanate group, KBE-9007 (manufactured by Shin-Etsu Chemical Co., Ltd.) can be mentioned.

By reacting a (meth)acrylamide compound having a hydroxyl group and an alkoxysilane compound having an isocyanate group in organic solvent or without organic solvent, a compound 1 can be obtained. Here, reaction without organic solvent means reacting the compounds without solvent.

As a preferable reaction condition, it is preferable that the reaction temperature is 20 to 80° C. and reaction is conducted for 1 to 8 hours.

If necessary, a known urethanization catalyst may be added to promote the reaction.

Examples of urethanization catalyst include octyl lead; tin catalysts such as dioctyl tin dilaurate, dibutyltin laurate, and tin octylate; tertiary amines such as trimethylamine, triethyl amine, tripropyl amine, tributylamine, triamyl amine, trihexylamine, trioctyl amine, trilaurylamine, dimethyl ethyl amine, dimethyl propyl amine, dimethyl butyl amine, dimethyl amyl amine, dimethyl hexyl amine, dimethyl cyclohexyl amine, dimethyl octyl amine, dimethyl lauryl amine, triallylamine, tetramethyl ethylene diamine, triethylenediamine, N-methylmorpholine, 4,4'-(oxydi-2,1-ethanediyl) bis-morpholine, N,N-dimethylbenzylamine, pyridine, picoline, dimethylaminomethylphenol, trisdimethylaminomethylphenol, 1,8-diazabicyclo[5.4.0]undec-7-ene (hereinafter, sometimes referred to as DBU), 1,5-diazabicyclo[4.3.0]non-5-ene (hereinafter, sometimes referred to as DBN), 1,4-diazabicyclo[2.2.2]octane, triethanolamine, N,N'-dimethylpiperazine, tetramethyl butanediamine, his (2,2-morpholinoethyl) ether, and his (dimethylaminoethyl) ether.

(Dispersion Medium)

Examples of the dispersion medium in the electroconductive polymer dispersion liquid include water; polar solvents such as N-methyl-2-pyrrolidone, N,N-dimethylformamide, N,N-dimethylacetamide, dimethyl sulfoxide, hexamethylene phosphotriamide, acetonitrile, and benzonitrile; phenols such as cresol, phenol, and xylenol; alcohols such as methanol, ethanol, propanol, and butanol; ketones such as acetone, and methyl ethyl ketone; hydrocarbons such as hexane, benzene, and toluene; carboxylic acids such as formic acid, and acetic acid; carbonate compounds such as ethylene carbonate, and propylene carbonate; ether compounds such as dioxane, and diethylether; chain-like ethers such as ethylene glycol dialkyl ethers, propylene glycol dialkyl ethers, polyethylene glycol dialkyl ethers, and polypropylene glycol dialkyl ethers; heterocyclic compounds such as 3-methyl-2-oxazolidinone; and nitrile compounds such as acetonitrile, glutarodinitrile, methoxy acetonitrile, propionitrile, and benzonitrile. One type of the solvent may be used, two or more types may be used as a mixture, or other organic solvent may be mixed. In one embodiment of the present invention, as the dispersion medium, water, an alcohol, and a polar solvent are preferable, and a mixture of water, an alcohol and a polar solvent is more preferable.

(Binder Resin)

The electroconductive polymer dispersion liquid preferably contains a binder resin in terms of enhancing durability and transparency of an electroconductive coating and enhancing adhesion property to a substrate.

The binder resin may be a thermosetting resin or a thermoplastic resin. Examples of the binder resin include polyesters such as polyethylene terephthalate, polybutylene terephthalate, and polyethylene naphthalate; polyamides such as polyimide, polyamideimide, polyamide 6, polyamide 6,6, polyamide 12, and polyamide 11; vinyl resins such as polyvinyl alcohol, polyvinyl butyral, polyvinyl acetate, and polyvinyl chloride; an epoxy resin, an oxetane resin, a xylene resin, an aramid resin, a polyimide silicone, a polyurethane, a polyurea, a melamine resin, a phenol resin, a polyether, an acrylic resin and a copolymer of these resins.

Among the binder resins, in terms of excellent adhesion property to a substrate, an oxetane resin, an epoxy resin, and an acrylic resin are preferable. One type of binder resin may be used, or two or more types may be used in combination.

Specific examples of oxetane resins and epoxy resins include epoxy resins and oxetane resins described in Japanese Unexamined Patent Application, First Publication No. 2010-168445. Specifically, as an epoxy compound, one or both of a water-soluble epoxy resin and an epoxy emulsion can be mentioned.

The "water-soluble epoxy resin" is a resin having an epoxy group and having solubility in order to dissolve 1 g or more resin in 100 g of water at 25° C. Examples of the water-soluble epoxy resin include neopentyl glycol diglycidyl ether, 1,6-hexanediol diglycidyl ether, trimethylolpropane polyglycidyl ether, hexahydrophthalic acid diglycidyl ester, hydrogenated bisphenol A diglycidyl ether, propylene glycol diglycidyl ether, tripropylene glycol diglycidyl ether, polypropylene glycol diglycidyl ether, fatty acid modified epoxy, diethylene diglycidyl ether, polyethylene glycol diglycidyl ether, glycerol polyglycidyl ether, diglycerol polyglycidyl ether, polyglycerol polyglycidyl ether, sorbitol-type polyglycidyl ether, ethylene oxide lauryl alcohol glycidyl ether, ethylene oxide phenol glycidyl ether, adipic acid glycidyl ether, and triglycidyl tris(2-hydroxyethyl) isocyanate.

The epoxy emulsion is an emulsion in which an oil-soluble epoxy resin having two or more epoxy groups is emulsified and dispersed in a dispersion medium such as water and organic solvent in the presence of a surfactant.

Examples of the epoxy resin include bifunctional type glycidyl ether type epoxy resins such as bisphenol A type, bisphenol F type, brominated bisphenol A type, hydrogenated bisphenol A type, bisphenol S type, bisphenol AF type, biphenyl type, naphthalene type, fluorene type, polyalkylene glycol type, and alkylene glycol type; polyfunctional type glycidyl ether type epoxy resins such as phenol novolac type, ortho-cresol novolac type, DPP novolac type, trifunctional type, tris-hydroxyphenyl methane type, and tetraphenylolethane type; glycidyl amine type epoxy resins such as tetraglycidyl diaminodiphenylmethane, triglycidyl isocyanurate, hydantoin type, TRAD-D type, aminophenol type, aniline type, and toluidine type; alicyclic epoxy resin; urethane-modified epoxy resin having an urethane bond; rubber-modified epoxy resin containing a polybutadiene or a polyacrylonitrile-butadiene.

Examples of the surfactant in the epoxy emulsion include an anionic surfactant, a cationic surfactant, and a nonionic surfactant. Among the surfactants, polyoxyethylene alkyl phenol ether, and polyoxyethylene polyoxypropylene block polyether are preferred.

Specific examples of the oxetane compound include compounds having bifunctional oxetane rings such as xylylene bis-oxetane, 3-ethyl-3{[(3-ethyloxetane-3-yl)methoxy]methyl}oxetane, 4,4'-(3-ethyloxetane-3-ylmethyl-oxymethyl)biphenyl, 1,4-bis{[(3-ethyl-3-oxetanyl)methoxy]methyl}benzene, di {1-ethyl(3-oxetanyl)}methyl ether, 1,6-bis{(3-ethyl-3-oxetanyl)methoxy}hexane, 9,9-bis{2-methyl-4-[2-(3-oxetanyl)]butoxyphenyl}fluorene, and 9,9-bis{4-{2-[2-(3-oxetanyl)]butoxy}ethoxyphenyl}fluorene; polyfunctional oxetane compounds such as oxetanized novolac resin; compounds having a mono-functional oxetane ring such as 3-ethyl-3-(hydroxymethyl)oxetane, 3-ethyl-3-(2-ethylhexyloxymethyl)oxetane, 3-ethyl-3-phenoxymethyloxetane, 3-(methacryloyloxymethyl)oxetane, and 3-(methacryloyloxy methyl)-2-phenyl oxetane.

Examples of the acrylic resin include a mono-functional acrylic compound and a multi-functional acrylic compound described in Japanese Unexamined Patent Application, First Publication No. 2012-97227. Specific examples of the acrylic resin include glycidyl(meth)acrylate, 2-hydroxyethyl (meth)acrylate, 2-hydroxypropyl(meth)acrylate, 4-hydroxybutyl(meth)acrylate, ethyl-α-hydroxymethyl acrylate, 2-hydroxyethyl acrylamide; bifunctional acrylic compounds such as dipropylene glycol di(meth)acrylate, 1,6-hexanediol di(meth)acrylate, tripropylene glycol di(meth)acrylate, dimethylol dicyclopentane di(meth)acrylate, polyethylene glycol (hereinafter referred to as PEG.) 400 di(meth)acrylate, PEG300 di(meth)acrylate, PEG600 di(meth)acrylate, N,N'-methylenebisacrylamide; tri functional acrylic compounds such as trimethylolpropane tri(meth)acrylate, trimethylolpropane ethoxy tri(meth)acrylate, glycerol propoxy tri (meth)acrylate, pentaerythritol tri(meth)acrylate, and ethoxylated glycerin triacrylate; tetra- or more functional acrylic compounds such as pentaerythritol ethoxy tetra(meth)acrylate, ditrimethylolpropane tetra(meth)acrylate, and pentaerythritol tetra(meth)acrylate; penta- or more functional acrylic compounds such as sorbitol pentaacrylate, dipentaerythritol penta(meth)acrylate; hexa- or more functional acrylic compounds such as dipentaerythritol hexa (meth)acrylate, sorbitol hexaacrylate, alkylene oxide-modified hexacrylate, caprolactone-modified dipentaerythritol hexaacrylate; and bi- or more functional urethane acrylate.

When the oxetane compound and the epoxy compound are contained as a binder resin in the electroconductive polymer dispersion liquid, the amount (total amount) of the oxetane compound and the epoxy compound in the electroconductive polymer dispersion liquid with respect to the total mass (100% by mass) of solid content of a π-conjugated electrically conductive polymer and a polyanion is preferably 1 to 300% by mass, more preferably 1 to 200% by mass, and still more preferably 10 to 100% by mass. When the amount (total amount) of the oxetane compound and the epoxy compound is less than 1% by mass, water resistance of the electroconductive coating is inadequate. When the total amount is greater than 200% by mass, the amount of the π-conjugated electrically conductive polymer becomes low, and adequate electrical conductivity may not be obtained. In one embodiment of the present invention, when the oxetane compound and the epoxy compound are included in the electroconductive polymer dispersion liquid within the range from 1 to 200% by mass with respect to 100% by mass of the total solid content of the π-conjugated electrically conductive polymer and the polyanion (i.e., electroconductive complex), water resistance of the electroconductive coating is enhanced, and adequate electrical conductivity can be obtained.

Here, the "solid content of the π-conjugated electrically conductive polymer and the polyanion" is the electroconductive complex as described above. The solid content of the π-conjugated electrically conductive polymer and the polyanion can be calculated based on the charged amount of raw materials.

In one aspect of the present invention, the amount of the binder resin with respect to the total mass of the electroconductive polymer dispersion liquid is preferably 1 to 30% by mass, and more preferably 3 to 15% by mass.

When the electroconductive polymer dispersion liquid contains the oxetane compound or the epoxy compound, the dispersion liquid preferably include a cation generating compound from the viewpoint of quickly and adequately curing the oxetane compound and the epoxy compound.

The cation generating compound is a compound that generates a Lewis acid. Specifically, light cationic initiator, and thermal cationic initiator can be mentioned.

Examples of the light cationic initiator include diazonium salts of Lewis acids, iodonium salts of Lewis acids, and sulfonium salts of Lewis acids. These compounds are onium salts having a cation moiety such as an aromatic diazonium, an aromatic iodonium and an aromatic sulfonium, and an anion moiety such as boron tetrafluoride ($BF_4^-$), hexafluorophosphate ($PF_6^-$), antimony hexafluoride ($SbF_6^-$) and $[BX4]^-$ (provided that, X represents a phenyl group substituted by two or more fluorine atoms or trifluoromethyl groups).

Examples of the thermal cationic initiator include cationic or protonic acid catalyst such as aromatic onium salts, trifluorosulfonic acid salts, boron trifluoride ether complex compounds and boron trifluoride. Among these, an aromatic onium salt is preferred. The light cationic initiator and the thermal cationic initiator may be used in combination.

In one embodiment of the present invention, when the electroconductive polymer dispersion liquid contains a cation generating compound, the amount of the cation generating compound with respect to the amount of the oxetane compound or the epoxy compound is preferably 0.1 to 10% by mass, and more preferably 0.5 to 5% by mass.

When the electroconductive polymer dispersion liquid contains the acrylic resin as a binder resin, the amount of the acrylic resin with respect to the total amount of the π-conjugated electrically conductive polymer and the polyanion is preferably 0.05 to 50% by mass, and more preferably 0.3 to 30% by mass. When the amount of the acrylic resin is no less than the lower limit, film formability of the electroconductive coating is adequately enhanced. When the amount of the acrylic resin is no more than the upper limit, sufficient amount of the π-conjugated electrically conductive polymer is contained in the electroconductive coating to obtain adequate electrical conductivity.

The total amount of the π-conjugated electrically conductive polymer and the polyanion can be calculated based on the charged amount of raw materials.

[Other Dopant]

To the electroconductive polymer dispersion liquid, in order to enhance electrical conductivity, other dopant may be added in addition to the polyanion. As other dopant, a donor type or an acceptor type may be used as long as oxidation-reduction reaction of the π-conjugated electrically conductive polymer can be conducted. Examples of other dopants include compounds described in Japanese Unexamined Patent Application, First Publication No. 2008-133415. Specific example include Lewis acids such as $PF_5$, $AsF_5$, $SbF_5$, and $BF_5$; inorganic acids such as hydrochloric acid, sulfuric acid, nitric acid, phosphoric acid, fluoroboric acid, hydrofluoric acid, and perchloric acid; organic carboxylic acids such as formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitro acid, and triphenyl acetic acid; organic sulfonic acids such as methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethane sulfonic acid, 3-chloro-2-hydroxypropane sulfonic acid, trifluoromethane sulfonic acid, trifluoroethane sulfonic acid, colistin methane sulfonic acid, 2-acrylamido-2-methylpropanesulfonic acid, amino methanesulfonic acid, 1-amino-2-naphthol-4-sulfonic acid, 2-amino-5-naphthol-7-sulfonic acid, 3-aminopropane sulfonic acid, N-cyclohexyl-3-aminopropane sulfonic acid, benzenesulfonic acid, alkylbenzenesulfonic acid, p-toluenesulfonic acid, xylene sulfonic acid, ethylbenzene sulfonic acid, propylbenzene sulfonic acid, butylbenzene sulfonic acid, pentyl benzene sulfonic acid, hexylbenzene sulfonic acid, heptylbenzene sulfonic acid, octylbenzene sulfonic acid, nonylbenzene sulphonic acid, decylbenzene sulfonic acid, undecylbenzene sulfonic acid, dodecylbenzenesulfonic acid, pentadecylbenzene sulfonic acid, hexadecylbenzene sulfonic acid, 2,4-dimethylbenzene sulfonic acid, di-propyl benzene sulfonic acid, 4-aminobenzene sulfonic acid, o-aminobenzene sulfonic acid, m-aminobenzene sulfonic acid, 4-amino-2-chlorotoluene-5-sulfonic acid, 4-amino-3-methylbenzene-1-sulfonic acid, 4-amino-5-methoxy-2-methylbenzenesulfonic acid, 2-amino-5-methylbenzene-1-sulfonic acid, 4-amino-2-methylbenzene-1-sulfonic acid, 5-amino-2-methylbenzene-1-sulfonic acid, 4-amino-3-methyl-benzene 1-sulfonic acid, 4-acetamido-3-chlorobenzene sulfonic acid, 4-chloro-3-nitrobenzene sulfonic acid, p-chlorobenzene sulfonic acid, naphthalene sulfonic acid, methylnaphthalene sulfonic acid, propylnaphthalene sulfonic acid, butylnaphthalene sulfonic acid, pentylnaphthalene sulfonic acid, 4-amino-1-naphthalene sulfonic acid, 8-chloro-naphthalene-1-sulfonic acid, naphthalenesulfonic acid-formalin polycondensate, melamine sulfonate-formalin polycondensate, anthraquinone sulfonic acid, pyrene sulfonic acid, ethane disulfonic acid, butane disulfonic acid, pentane disulfonic acid, decane disulfonic acid, o-benzene disulfonic acid, m-benzene disulfonic acid, p-benzene disulfonic acid, toluene disulfonic acid, xylylene acid, chlorobenzene disulfonic acid, fluorobenzene disulfonic acid, dimethyl benzene disulfonic acid, diethylbenzene disulfonic acid, aniline-2,4-disulfonic acid, aniline-2,5-disulfonic acid, 3,4-dihydroxy-1,3-benzene disulfonic acid, naphthalene disulfonic acid, methylnaphthalene disulfonic acid, ethylnaphthalene disulfonic acid, pentadecylnaphthalene disulfonic acid, 3-amino-5-hydroxy-2,7-naphthalene disulfonic acid, 1-acetamido-8-hydroxy-3,6-naphthalene disulfonic acid, 2-amino-1,4-benzene disulfonic acid, 1-amino-3,8-naphthalene dicarboxylic acid, 3-amino-1,5-naphthalene disulfonic acid, 8-amino-1-naphthol-3,6-disulfonic acid, 4-amino-5-naphthol-2,7-disulfonic acid, 4-acetamido-4'-isothiocyanato-stilbene-2,2'-disulfonic acid, 4-acetamido-4'-isothiocyanato-stilbene-2,2'-disulfonic acid, 4-acetamido-4'-maleimidyl-stilbene-2,2'-disulfonic acid, naphthalene trisulfonic acid, dinaphthylmethanedisulfonic sulfonic acid, anthraquinone disulfonic acid, and anthracene sulfonic acid.

[Conductivity Improver]

In one embodiment of the present invention, the electroconductive polymer dispersion liquid may contain a conductivity improver. The conductivity improver is a component to improve electrical conductivity of the electroconductive coating formed from the electroconductive polymer dispersion liquid.

As a conductivity improver, at least one compound selected from the group consisting of the aforementioned acrylic compound, a nitrogen-containing aromatic cyclic compound, a compound having two or more hydroxyl groups, a compound having two or more carboxyl groups, a compound having one or more hydroxyl group and one or more carboxy group, a compound having an amide group, a compound having an imide group, a lactam compound, a compound having a glycidyl group, and a water-soluble organic solvent.

Specific examples of these compounds are described in Japanese Unexamined Patent Application, First Publication No. 2010-87401. Specific examples of conductivity improver include pyridines and derivatives thereof such as pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxyaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, 3-pyridinesulfonic acid; imidazoles and derivatives thereof such as imidazole, 2-methylimidazole, 2-propyl imidazole, 2-undecylimidazole, 2-phenylimidazole, N-methyl imidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazol; pyrimidines and derivatives thereof such as 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol; pyrazines and derivatives thereof such as pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, and 2,3-diethylpyrazine; triazines and derivatives thereof such as 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridyl-1,3,5-triazine, 3-(2-pyridyl)-5,6-bis(4-phenylsulfonic acid)-1,2,4-triazine disodium, 3-(2-pyridyl)-5,6-diphenyl-1,2,4-triazine, 3-(2-pyridyl)-5,6-diphenyl-1,2,4-triazine-ρ,ρ'-disulfonic acid disodium, and 2-hydroxy-4,6-dichloro-1,3,5-triazine; polyhydric aliphatic alcohols such as propylene glycol, 1,3-butylene glycol, 1,4-butylene glycol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, tartaric acid, D-glucaric acid, glutaconic acid; polymer alcohols such as cellulose, polysaccharide, sugar alcohol; aromatic compounds having two or more hydroxy groups such as aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxyphenylsulfone, hydroxyquinone carboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinone sulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphtoic acid phenyl ester, 4,5-dihydroxynaphthalene-2,7-disulfonic acid and salts thereof, 1,8-dihydroxy-3,6-naphthalene disulfonic acid and salts thereof, 6,7-dihydroxy-2-naphthalene sulfonic acid and salts thereof, 1,2,3-trihydroxybenzene(pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate and ethyl gallate, and potassium hydroquinone sulfonate; compounds having two or more carboxyl groups such as aliphatic carboxylic acid compounds (such as maleic acid, fumaric acid, itaconic acid, citraconic acid, malonic acid, 1,4-butane dicarboxylic acid, succinic acid, tartaric acid, adipic acid, D-glucaric acid, glutaconic acid, citric acid), aromatic carboxylic acid compounds in which at least one or more carboxyl groups is bonded to the aromatic ring (such as phthalic acid, terephthalic acid, isophthalic acid, tetrahydrophthalic anhydride, 5-sulfoisophthalic acid, 5-hydroxy isophthalic acid, methyl tetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid, pyromellitic acid), diglycolic acid, oxydibutyric acid, thio-diacetic acid (thiodiacetic acid), thiodibutylic acid, iminodiacetic acid, and iminodibutylic acid; compounds having one or more hydroxyl group and one or more carboxy group such as tartaric acid, glycerin acid, dimethylol butanoic acid, dimethylol propanoic acid, D-glucaric acid, glutaconic acid; amide compounds such asacetamide, malonamide, succinamide, maleamide, fumaramide, benzamide, naphthamide, phthal amide, isophthalamide, terephthalamide, nicotinamide, isonicotinamide, 2-furamide, formamide, N-methylformamide, propionamide, propiolamide, butylamide, isobutylamide, methacrylamide, palmitamide, stearylamide, oleamide, oxamide, glutaramide, adipamide, cinnamamide, glucolamide, lactamide, glyceramide, tartaramide, citramide, glyoxylamide, pulvamide, acetoacetamide, dimethylacetamide, benzyl amide, anthranylamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, N-methyacrylamide, N-methylmethacrylamide, N-ethylacrylamide, N-ethylmethacrylamide, N,N-dimethylacrylamide, N,N-dimethyl-methacrylamide, N,N-diethyl-acrylamide, N,N-diethyl methacrylamide, 2-hydroxyethyl acrylamide, 2-hydroxyethyl methacrylamide, N-methylolacrylamide, N-methylolmethacrylamide; imide compounds such as cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidooxycarbonyloxy)ethyl]sulfone, α-methyl-α-propylsuccinimide and cyclohexylimide, 1,3-dipropyleneurea, maleimide, N-methylmaleimide, N-ethylmaleimide, N-hydroxymaleimide, 1,4-bismaleimidobutane, 1,6-bismaleimidohexane, 1,8-bismaleimidooctane and N-carboxheptylmaleimide; lactam compounds such as pentano-4-lactam, 4-pentanelactam-5-methyl-2-pyrrolidone, 5-methyl-2-pyrrolidinone, hexano-6-lactam, and 6-hexanelactam; compounds containing a glycidyl group such as ethyl glycidyl ether, butyl glycidyl ether, t-butyl glycidyl ether, allyl glycidyl ether, benzyl glycidyl ether, glycidyl phenyl ether, bisphenol A, diglycidyl ether, glycidyl acrylate, and glycidyl methacrylate; silane coupling agents such as vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilan; water-soluble organic solvents such as polar solvents (e.g., N-methyl-2-pyrrolidone, N-methylacetamide, N,N-dimethylformamide, N,N-dimethylacetamide, dimethylsulfoxide, hexamethylenephosphortriamide, N-vinylpyrrolidone, N-vinylformamide and N-vinylacetamid), phenols (e.g., cresol, phenol and xylenol), polyhydric aliphatic alcohols (e.g., ethylene glycol, propylene glycol, dipropylene glycol, 1,3-butylene glycol, 1,4-butylene glycol, D-glucose, D-glucitol, isoprene glycol, butanediol, 1,5-pentanediol, 1,6-hexanediol, 1,9-nonanediol, and neopentyl glycol), carbonate compounds (e.g., ethylene carbonate and propylene carbonate), ether compounds (e.g., dioxane, and diethyl ether), chain-like ether compounds (e.g., dialkyl ethers, propylene glycol dialkyl ethers, polyethylene glycol dialkyl ethers, and polypropylene glycol dialkyl ethers), heterocyclic compounds (e.g., 3-methyl-2-oxazolidinone) and nitrile compounds (e.g., acetonitrile, glutarodinitrile, methoxyacetonitrile, propionitrile, and benzonitrile).

When the electroconductive polymer dispersion liquid contains a conductivity improver, the amount of the conductivity improver with respect to the total amount (100 parts by mass) of a π-conjugated electrically conductive polymer and a polyanion is preferably 10 to 10,000 parts by mass.

(Additive)

In one embodiment of the present invention, the electroconductive polymer dispersion liquid may contain an additive, if necessary.

The additive is not particularly limited as long as the additive is compatible with the π-conjugated electrically conductive polymer, and the polyanion. Examples of the additive include inorganic conductive agents, surfactants, antifoaming agents, coupling agents, antioxidants, ultraviolet absorbers and the like. In one embodiment of the present invention, as the additive, a compound which can exhibit stability in the electroconductive polymer dispersion liquid, and which does not reduce dispersibility of the π-conjugated electrically conductive polymer and the polyanion is preferably used.

Examples of the inorganic conductive agent include metal ions, and conductive carbon. As the metal ions, a solution in which a metal salt is dissolved in water can be used.

Examples of surfactant include anionic surfactants such as carboxylates, sulfonates, sulfate salts, and phosphate ester salts; cationic surfactants such as amine salts, and tertiary ammonium salts; amphoteric surfactants such as carboxybetaine, amino carboxylic acid salt, and imidazolium betaine; and non-ionic surfactants such as polyoxyethylene alkyl ethers, polyoxyethylene glycerin fatty acid esters, ethylene glycol fatty acid esters, and polyoxyethylene fatty acid amides.

Examples of antifoaming agent include silicone resins, polydimethylsiloxane, and silicone resins.

Examples of coupling agent include a silane coupling agent having a vinyl group, an amino group or an epoxy group.

Examples of antioxidant include phenol-based antioxidants, amine-based antioxidants, phosphorus-based antioxidants, sulfur-based antioxidants, sugars, and vitamins.

Examples of ultraviolet absorber include benzotriazole-based ultraviolet absorbers, benzophenone-based ultraviolet absorbers, salicylate-based ultraviolet absorbers, cyanoacrylate-based ultraviolet absorbers, Ogizanirido-based ultraviolet absorber, hindered amine-based ultraviolet absorbers, and benzoate-based ultraviolet absorbers. The antioxidant and the ultraviolet absorber are preferably used in combination.

The electroconductive polymer dispersion liquid is a dispersion liquid in which a π-conjugated electrically conductive polymer, a polyanion and at least part of the compound 1 are dispersed in the dispersion medium. In one aspect of the present invention, the amount of the component other than the dispersion medium in the electroconductive polymer dispersion liquid with respect to the total amount of the electroconductive polymer dispersion liquid is preferably 0.1 to 50% by mass, and more preferably 0.5 to 20% by mass. The amount can be calculated based on the charged amount of the raw materials.

(Production Method of Electroconductive Polymer Dispersion Liquid)

As a method of producing the electroconductive polymer dispersion liquid, a method containing: subjecting precursor monomers of a π-conjugated electrically conductive polymer to chemical oxidative polymerization in the presence of a polyanion and a dispersion medium so as to obtain a dispersion liquid of a electroconductive complex in which the polyanion is doped to the π-conjugated electrically conductive polymer; and subsequently adding compound 1 to the dispersion liquid, can be mentioned.

(Function Effect)

In the electroconductive polymer dispersion liquid as described above, it is presumed that an amide group and an urethane group in the compound 1 interact between the π-conjugated electrically conductive polymers, thereby reducing hopping energy in conductivity mechanism. Consequently, the electrical conductivity can be enhanced.

The alkoxysilane group in the compound 1 performs as a coupling agent between the electroconductive complex and the substrate to which the electroconductive polymer dispersion liquid is applied. Consequently, substrate adhesion property of the electroconductive coating can be enhanced. Furthermore, it is presumed that the alkoxysilane group acts as an inorganic crosslinking functional group, and hence, heat resistance and moist-heat resistance are improved. It is presumed that the (meth)acrylamide group in the compound 1 acts as an organic crosslinking functional group, and hence, heat resistance and moist-heat resistance can be improved.

According to the electroconductive polymer dispersion liquid, an electroconductive coating having excellent electrical conductivity, heat resistance, moist-heat resistance, and substrate adhesion property can be readily formed.

<Electroconductive Coating>

In one aspect of the present invention, an electroconductive coating can be formed by curing the electroconductive polymer dispersion liquid to form a thin film. In another aspect of the present invention, an electroconductive coating can be formed by applying the electroconductive polymer dispersion liquid to a substrate, followed by curing the dispersion liquid. As a method of applying the electroconductive polymer dispersion liquid, for example, dipping, comma coating, spray coating, roll coating, gravure printing and the like can be mentioned.

After applying, by curing the coating liquid through heating treatment or ultraviolet irradiation treatment, an electroconductive coating can be formed.

The thickness of the coating film is preferably 1 to 1,000 nm, and more preferably 10 to 800 nm.

As the heating treatment, for example, a normal method such as hot-air heating or infrared heating can be employed. As the ultraviolet irradiation treatment, a method in which ultraviolet is irradiated from a light source such as ultra-high pressure mercury lamp, high pressure mercury lamp, low pressure mercury lamp, carbon arc, xenon arc, and metal halide lamp can be employed. As heating temperature, 60 to 180° C. is preferred. When ultraviolet irradiation treatment is carried out, the irradiance level of ultraviolet is preferably 100 to 2,000 mJ/cm$^2$.

Examples of the substrate to which the electroconductive polymer dispersion liquid is applied include a resin film or paper.

Examples of resin material constituting the resin film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyacrylate, styrene-based elastomers, polyester-based elastomers, polyether sulfone, polyether imides, polyether ether ketone, polyphenylene sulfide, polyarylate, polyimide, polycarbonate, cellulose triacetate, and cellulose acetate propionate. Among these resin material, polyethylene terephthalate is preferable in terms of transparency, flexibility, anti-pollution property and strength.

Examples of paper include high-quality paper, kraft paper, and coated paper.

As the substrate, a substrate having a thickness of 10 to 1,000 μm is preferable, and more preferably 50 to 500 μm.

The electroconductive coating is formed from the electroconductive polymer dispersion liquid. Consequently, electrical conductivity, heat resistance, moist-heat resistance, and substrate adhesion property are excellent.

Another aspect of the present invention is shown as follows.

(1) An electroconductive polymer dispersion liquid including an electroconductive complex of a π-conjugated electrically conductive polymer and a polyanion, a compound 1 represented by following chemical formula (1), a binder resin, and a dispersion medium, wherein
the amount of the electroconductive complex with respect to the total mass of the electroconductive polymer dispersion liquid is 0.05 to 5.0% by mass;

[Chemical Formula 2]

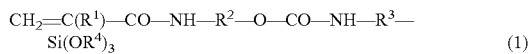

$$CH_2=C(R^1)-CO-NH-R^2-O-CO-NH-R^3-Si(OR^4)_3 \qquad (1)$$

in the formula (1), $R^1$ represents a hydrogen atom or a methyl group; $R^2$ represents a methylene group, an ethylene group or a trimethylene group; $R^3$ represents a trimethylene group; and $R^4$ represents a methyl group.

(2) The electroconductive polymer dispersion liquid according to (1), wherein the amount of the compound 1 with respect to the total mass of the electroconductive complex is 0.01 to 300 parts by mass.

(3) The electroconductive polymer dispersion liquid according to (1) or (2), wherein the dispersion liquid is at least one solvent selected from the group consisting of water, an alcohol, and a polar solvent.

(4) The electroconductive polymer dispersion liquid according to any one of (1) to (3), wherein the binder resin is at least one resin selected from the group consisting of an oxetane resin, an epoxy resin and an acrylic resin.

(5) An electroconductive coating formed from the electroconductive polymer dispersion liquid of any one of (1) to (4).

EXAMPLES

Production Example 1

Synthesis of Polystyrene Sulfonic Acid (Polyanions)

206 g of sodium styrene sulfonate were dissolved in 1000 ml of ion exchange water followed by adding thereto, a solution of 1.14 g of ammonium persulfate preliminarily dissolved in 10 ml of water in a dropwise manner over 20 minutes while stirring at 80° C., and further stirring the solution for 12 hours. 1000 ml of sulfuric acid diluted to 10% by mass was added to the resulting sodium styrene sulfonate-containing solution. Subsequently, about 1,000 ml of polystyrene sulfonate-containing solution were removed using ultrafiltration. Moreover, 2,000 ml of ion exchange water were added to the residual liquid, and about 2,000 ml of solution were removed using ultrafiltration. The aforementioned ultrafiltration procedure was repeated three times. Subsequently, 2,000 ml of ion exchange water were added to the obtained filtrate, and about 2,000 ml of solution were removed using ultrafiltration. The aforementioned ultrafiltration procedure was repeated three times and the water in the resulting solution was removed under reduced pressure to obtain polystyrene sulfonate in the form of a colorless solid. The number average degree of polymerization of the obtained polystyrene sulfonate was about 1,650.

Production Example 2

Preparation of Dispersion of Electroconductive Complex 14.2 g of 3,4-ethylenedioxythiophene and a solution obtained by dissolving 36.7 g of the polystyrene sulfonate in 2,000 ml of ion exchange water were mixed at 20° C.

While holding at 20° C., an oxidation catalyst solution obtained by dissolving 29.64 g of ammonium persulfate and 8.0 g of ferric sulfate in 200 ml of ion exchange water were slowly added to the resulting mixed solution while stirring. The reaction was allowed to proceed for 3 hours.

2,000 ml of ion exchange water were added to the resulting reaction liquid and about 2,000 ml of the solution were removed using ultrafiltration. This procedure was repeated three times.

Next, 200 ml of dilute sulfuric acid having a concentration of 10% by mass and 2,000 ml of ion exchange water were added to the treated liquid on which the aforementioned ultrafiltration was carried out, and about 2,000 ml of the treated liquid were removed using ultrafiltration. Subsequently, 2,000 ml of ion exchange water were further added to the solution, and about 2000 ml of liquid were removed using ultrafiltration. This procedure was repeated three times.

Moreover, 2,000 ml of ion exchange water were added to the resulting treated liquid and about 2,000 ml of the treated liquid were removed by ultrafiltration. This procedure was repeated five times to obtain a dispersion liquid of about 1.2% by mass of blue colored polystyrene sulfonate-doped poly(3,4-ethylenedioxythiophene) (hereinafter, referred to as "PEDOT-PSS dispersion liquid").

Production Example 3-1

Preparation of Compound (1a)

Into a reaction vessel equipped with a stirrer, a reflux condenser, a nitrogen gas inlet tube, 367.79 g of N-hydroxymethylacrylamide, 900 g of 3-isocyanatopropyltrimethoxysilane, and 18 g of diazabicycloundecene are fed, and stirred at 60° C. for 4 hours under nitrogen atmosphere, thereby obtaining a reaction product.

The completion of the reaction was determined by disappearance of absorption peak of the isocyanate group within the wavelength of 2200 to 2300 $cm^{-1}$, in accordance with infrared absorption (IR) spectrum measurement.

Production Example 3-2

Preparation of Compound (1b)

Into a reaction vessel equipped with a stirrer, a reflux condenser, a nitrogen gas inlet tube, 418.82 g of N-hydroxymethylmethacrylamide, 900 g of 3-isocyanatopropyltrimethoxysilane, 18 g of diazabicycloundecene are fed, and stirred at 60° C. for 4 hours under nitrogen atmosphere, thereby obtaining a reaction product.

The completion of the reaction was determined by disappearance of absorption peak of the isocyanate group within the wavelength of 2200 to 2300 $cm^{-1}$, in accordance with infrared absorption (IR) spectrum measurement.

Production Example 3-3

Preparation of Compound (1c)

Into a reaction vessel equipped with a stirrer, a reflux condenser, a nitrogen gas inlet tube, 418.9 g of 2-hydroxyethylacrylamide, 900 g of 3-isocyanatopropyltrimethoxysilane, and 18 g of diazabicycloundecene are fed, and stirred at 60° C. for 4 hours under nitrogen atmosphere, thereby obtaining a reaction product.

The completion of the reaction was determined by disappearance of absorption peak of the isocyanate group within the wavelength of 2200 to 2300 $cm^{-1}$, in accordance with infrared absorption (IR) spectrum measurement.

Production Example 3-4

Preparation of Compound (1d)

Into a reaction vessel equipped with a stirrer, a reflux condenser, a nitrogen gas inlet tube, 469.86 g of 2-hydroxyethylmethacrylamide, 900 g of 3-isocyanatopropyltrimethoxysilane, and 18 g of diazabicycloundecene are fed, and stirred at 60° C. for 4 hours under nitrogen atmosphere, thereby obtaining a reaction product.

The completion of the reaction was determined by disappearance of absorption peak of the isocyanate group within the wavelength of 2200 to 2300 $cm^{-1}$, in accordance with infrared absorption (IR) spectrum measurement.

Production Example 3-5

Preparation of Compound (1e)

Into a reaction vessel equipped with a stirrer, a reflux condenser, a nitrogen gas inlet tube, 469.28 g of 2-hydroxypropylacrylamide, 900 g of 3-isocyanatopropyltrimethoxysilane, and 18 g of diazabicycloundecene are fed, and stirred at 60° C. for 4 hours under nitrogen atmosphere, thereby obtaining a reaction product.

The completion of the reaction was determined by disappearance of absorption peak of the isocyanate group within the wavelength of 2200 to 2300 $cm^{-1}$, in accordance with infrared absorption (IR) spectrum measurement.

Example 1

To 100 g of the PEDOT-PSS dispersion liquid prepared in Production Example 2, 133 g of ethanol, 1.2 g of the compound (1a) prepared in Production Example 3-1, 3 g of polyglycerol polyglycidyl ether as a binder resin (SR-4GLS, manufactured by Sakamoto Yakuhin Kogyo Co.), 0.03 g of San-Aid SI-110L as a cation generating compound (manufactured by Sanshin chemical industry Co., Ltd.), and 3.3 g of dimethyl sulfoxide were added, followed by stirring, thereby obtaining an electroconductive polymer dispersion liquid A.

The electroconductive polymer dispersion liquid A was applied to a polyethylene terephthalate film (A4300, manufactured by Toyobo Co., Ltd., thickness: 188 μm) using a barcoater, followed by drying at 130° C. for 2 minutes using infrared heating, thereby forming an electroconductive coating.

Surface resistivity, total light transmittance, haze, and adhesion property before and after heat resistance test and before and after moist-heat resistance test were evaluated in accordance with the following procedure. These results are shown in Tables 1 and 2.

[Heat Resistance Test]

Surface resistivity, total light transmittance and haze of the electroconductive coating were measured in accordance with the following procedure, and adhesion property was evaluated in accordance with the following procedure. The electroconductive coating was stored in a thermostatic bath at 85° C. for 240 hours. Then, surface resistivity, total light transmittance and haze of the electroconductive coating taken out from the bath were measured in accordance with the following method, and adhesion property was evaluated the following method. The measurement results and evaluation results are shown in Table 1.

[Moist-Heat Resistance Test]

Surface resistivity, total light transmittance and haze of the electroconductive coating were measured in accordance with the following procedure, and adhesion property was evaluated the following procedure. The electroconductive coating was stored in a thermostatic bath at 65° C., under relative humidity of 90% for 240 hours. Then, surface resistivity, total light transmittance and haze of the electroconductive coating taken out from the bath were measured, and adhesion property was evaluated. The measurement results and evaluation results are shown in Table 2.

[Surface Resistivity]

Using Loresta MCP-T600 manufactured by a Mitsubishi Chemical Corporation, surface resistivity was measured according to JIS K7194.

[Total Light Transmittance and Haze]

Using haze measuring instrument (NDH5000) manufactured by Nippon Denshoku Industries Co., Ltd., total light transmittance and haze were measured in accordance with JIS K7136.

[Evaluation of Adhesion Property]

On the surface of the electroconductive coating, an incision was made in a reticular pattern using a cutter knife so that the incision was reached to the polyethylene terephthalate film. To the surface of the electroconductive coating having an incision, a cellophane tape was attached, and then peeled. The peeling situation of the electroconductive coating was visually observed, and adhesion property to a substrate was evaluated in accordance with the following evaluation criteria.

S: Not peeled, A: slightly peeled, B: partially peeled, C: completely peeled

Example 2

An electroconductive polymer dispersion liquid B was prepared in the same manner as in Example 1 except that 1.2 g of the compound (1a) prepared in Production Example 3-1 (100 parts by mass) was changed to 1.08 g of the compound (1a) (90 parts by mass), the amount of the polyglycerol polyglycidyl ether (SR-4GLS, manufactured by Sakamoto Yakuhin Kogyo Co.) was changed to 2.532 g, and the amount of San-Aid SI-110L (manufactured by Sanshin chemical industry Co., Ltd.) was changed to 0.02532 g.

An electroconductive coating was formed in the same manner as in Example 1 except that the electroconductive polymer dispersion liquid B was used instead of the electroconductive polymer dispersion liquid A, and evaluations was conducted. The evaluation results are shown in Tables 1 and 2.

Example 3

An electroconductive polymer dispersion liquid C was prepared in the same manner as in Example 1 except that 1.2 g of the compound (1a) (100 parts by mass) prepared in Production Example 3-1 was changed to 0.96 g of the compound (1b) (80 parts by mass) prepared in Production Example 3-2, the amount of the polyglycerol polyglycidyl ether (SR-4GLS, manufactured by Sakamoto Yakuhin Kogyo Co.) was changed to 2.132 g, and the amount of San-Aid SI-110L (manufactured by Sanshin chemical industry Co., Ltd.) was changed to 0.02132 g.

An electroconductive coating was formed in the same manner as in Example 1 except that the electroconductive polymer dispersion liquid C was used instead of the electroconductive polymer dispersion liquid A, and evaluations was conducted. The evaluation results are shown in Tables 1 and 2.

Example 4

An electroconductive polymer dispersion liquid D was prepared in the same manner as in Example 1 except that 1.2 g of the compound (1a) prepared in Production Example 3-1 (100 parts by mass) was changed to 0.84 g of the compound (1b) (70 parts by mass) prepared in Production Example 3-2, the amount of the polyglycerol polyglycidyl ether (SR-4GLS, manufactured by Sakamoto Yakuhin Kogyo Co.) was changed to 2.935 g, and the amount of San-Aid SI-110L (manufactured by Sanshin chemical industry Co., Ltd.) was changed to 0.02935 g.

An electroconductive coating was formed in the same manner as in Example 1 except that the electroconductive polymer dispersion liquid D was used instead of the electroconductive polymer dispersion liquid A, and evaluations was conducted. The evaluation results are shown in Tables 1 and 2.

Example 5

An electroconductive polymer dispersion liquid E was prepared in the same manner as in Example 1 except that 1.2 g of the compound (1a) prepared in Production Example 3-1 (100 parts by mass) was changed to 0.72 g of the compound (1c) (60 parts by mass) prepared in Production Example 3-3, 3 g of polyglycerol polyglycidyl ether (SR-4GLS, manufactured by Sakamoto Yakuhin Kogyo Co.) was changed to 1.125 g of xylylene bisoxetane (manufactured by Toagosei Co., Ltd.), and the amount of San-Aid SI-110L (manufactured by Sanshin chemical industry Co., Ltd.) was changed to 0.01125 g.

An electroconductive coating was formed in the same manner as in Example 1 except that the electroconductive polymer dispersion liquid E was used instead of the electroconductive polymer dispersion liquid A, and evaluations was conducted. The evaluation results are shown in Tables 1 and 2.

Example 6

To 100 g of PEDOT-PSS dispersion liquid prepared in Production Example 2, 133 g of ethanol, 0.6 g of the compound (1c) (50 parts by mass) prepared in Production Example 3-3, 0.52 g of pentaerythritol triacrylate, 0.0052 g of Irgacure (manufactured by Ciba Specialty Chemicals Inc.) as a photo initiator, 3.3 g of 2-hydroxyethyl(meth)acrylate, and 0.36 g of 2,3,3',4,4',5'-hexahydroxybenzophenone were mixed, followed by stirring, thereby obtaining an electroconductive polymer dispersion liquid F.

The electroconductive polymer dispersion liquid F was applied to a polyethylene terephthalate film (A4300, manufactured by Toyobo Co., Ltd., thickness: 188 μm) using a barcoater, followed by drying at 100° C. for 2 minutes using infrared heating. Then, ultraviolet (high-pressure mercury vapor lamp, 120 W, 360 mJ/cm$^2$, 178 mW/cm$^2$) was irradiated to harden the dispersion liquid, thereby forming an electroconductive coating. The electroconductive coating was evaluated in the same manner as in Example 1. The evaluation results are shown in Tables 1 and 2.

Example 7

An electroconductive polymer dispersion liquid G was prepared in the same manner as in Example 1 except that 1.2 g of the compound (1a) prepared in Production Example 3-1 (100 parts by mass) was changed to 0.48 g of the compound (1d) (40 parts by mass) prepared in Production Example 3-4, the amount of the polyglycerol polyglycidyl ether (SR-4GLS, manufactured by Sakamoto Yakuhin Kogyo Co.) was changed to 2.25 g, and the amount of San-Aid SI-110L (manufactured by Sanshin chemical industry Co., Ltd.) was changed to 0.0225 g.

An electroconductive coating was formed in the same manner as in Example 1 except that the electroconductive polymer dispersion liquid G was used instead of the electroconductive polymer dispersion liquid A, and evaluations was conducted. The evaluation results are shown in Tables 1 and 2.

Example 8

An electroconductive polymer dispersion liquid H was prepared in the same manner as in Example 1 except that the 1.2 g of the compound (1a) prepared in Production Example 3-1 (100 parts by mass) was changed to 0.36 g of the compound (1d) (30 parts by mass) prepared in Production Example 3-4, the amount of the polyglycerol polyglycidyl ether (SR-4GLS, manufactured by Sakamoto Yakuhin Kogyo Co.) was changed to 2.58 g, and the amount of San-Aid SI-110L (manufactured by Sanshin chemical industry Co., Ltd.) was changed to 0.0258 g.

An electroconductive coating was formed in the same manner as in Example 1 except that the electroconductive polymer dispersion liquid H was used instead of the electroconductive polymer dispersion liquid A, and evaluations was conducted. The evaluation results are shown in Tables 1 and 2.

Example 9

An electroconductive polymer dispersion liquid I was prepared in the same manner as in Example 1 except that 1.2 g of the compound (1a) prepared in Production Example 3-1 (100 parts by mass) was changed to 0.24 g of the compound (1e) (20 parts by mass) prepared in Production Example 3-5, 3 g of polyglycerol polyglycidyl ether (SR-4GLS, manufactured by Sakamoto Yakuhin Kogyo Co.) was changed to 2.63 g of diglycerol polyglycidyl ether (SR-DGE, manufactured by Sakamoto Yakuhin Kogyo Co.), and the amount of San-Aid SI-110L (manufactured by Sanshin chemical industry Co., Ltd.) was changed to 0.0263 g.

An electroconductive coating was formed in the same manner as in Example 1 except that the electroconductive polymer dispersion liquid I was used instead of the electroconductive polymer dispersion liquid A, and evaluations was conducted. The evaluation results are shown in Tables 1 and 2.

Example 10

An electroconductive polymer dispersion liquid J was prepared in the same manner as in Example 1 except that 1.2 g of the compound (1a) prepared in Production Example 3-1 (100 parts by mass) was changed to 0.12 g of the compound (1e) (10 parts by mass) prepared in Production Example 3-5, 3 g of polyglycerol polyglycidyl ether (SR-4GLS, manufactured by Sakamoto Yakuhin Kogyo Co.) was changed to 2.28 g of diglycerol polyglycidyl ether (SR-DGE, manufactured by Sakamoto Yakuhin Kogyo Co.), and the amount of San-Aid SI-110L (manufactured by Sanshin chemical industry Co., Ltd.) was changed to 0.0283 g.

An electroconductive coating was formed in the same manner as in Example 1 except that the electroconductive polymer dispersion liquid J was used instead of the electroconductive polymer dispersion liquid A, and evaluations was conducted. The evaluation results are shown in Tables 1 and 2.

Comparative Example 1

An electroconductive coating was formed in the same manner as in Example 1 except that the compound (1a) was not used. Then, the electroconductive coating was evaluated as in Example 1. The evaluation results are shown in Table 1 and 2.

Comparative Example 2

An electroconductive coating was formed in the same manner as in Example 2 except that the compound (1a) was not used. Then, the electroconductive coating was evaluated as in Example 1. The evaluation results are shown in Table 1 and 2.

Comparative Example 3

An electroconductive coating was formed in the same manner as in Example 3 except that the compound (1b) was not used. Then, the electroconductive coating was evaluated as in Example 1. The evaluation results are shown in Table 1 and 2.

Comparative Example 4

An electroconductive coating was formed in the same manner as in Example 4 except that the compound (1b) was not used. Then, the electroconductive coating was evaluated as in Example 1. The evaluation results are shown in Table 1 and 2.

Comparative Example 5

An electroconductive coating was formed in the same manner as in Example 5 except that the compound (1c) was not used. Then, the electroconductive coating was evaluated as in Example 1. The evaluation results are shown in Table 1 and 2.

Comparative Example 6

An electroconductive coating was formed in the same manner as in Example 6 except that the compound (1c) was not used. Then, the electroconductive coating was evaluated as in Example 1. The evaluation results are shown in Table 1 and 2.

Comparative Example 7

An electroconductive coating was formed in the same manner as in Example 7 except that the compound (1d) was not used. Then, the electroconductive coating was evaluated as in Example 1. The evaluation results are shown in Table 1 and 2.

Comparative Example 8

An electroconductive coating was formed in the same manner as in Example 8 except that the compound (1d) was not used. Then, the electroconductive coating was evaluated as in Example 1. The evaluation results are shown in Table 1 and 2.

Comparative Example 9

An electroconductive coating was formed in the same manner as in Example 9 except that the compound (1e) was not used. Then, the electroconductive coating was evaluated as in Example 1. The evaluation results are shown in Table 1 and 2.

Comparative Example 10

An electroconductive coating was formed in the same manner as in Example 10 except that the compound (1e) was not used. Then, the electroconductive coating was evaluated as in Example 1. The evaluation results are shown in Table 1 and 2.

Reference Example 1

Total light transmittance and haze of polyethylene terephthalate film were measured. The measurement results are shown in Table 1 and 2.

TABLE 1

| | RESULTS OF HEAT RESISTANCE TEST | | | | | |
|---|---|---|---|---|---|---|
| | AMOUNT OF COMPOUND 1* | SURFACE RESISTIVITY ($\Omega$/sq) | | VALUE BEFORE | TOTAL LIGHT TRANSMITTANCE (%) | |
| | (PARTS BY MASS) | BEFORE TEST | AFTER TEST | TEST/VALUE AFTER TEST | BEFORE TEST | AFTER TEST |
| EXAMPLE 1 | 100 | 408 | 428 | 1.05 | 88.5 | 87.6 |
| EXAMPLE 2 | 80 | 420 | 433 | 1.03 | 88.8 | 87.0 |
| EXAMPLE 3 | 80 | 459 | 491 | 1.07 | 88.9 | 88.0 |
| EXAMPLE 4 | 70 | 406 | 438 | 1.08 | 89.0 | 87.2 |
| EXAMPLE 5 | 60 | 422 | 460 | 1.09 | 88.7 | 87.8 |
| EXAMPLE 6 | 50 | 414 | 460 | 1.11 | 88.8 | 87.9 |

TABLE 1-continued

RESULTS OF HEAT RESISTANCE TEST

|  | Amount | Before | After | Ratio | Before | After |
|---|---|---|---|---|---|---|
| EXAMPLE 7 | 40 | 467 | 542 | 1.16 | 88.9 | 88.0 |
| EXAMPLE 8 | 30 | 421 | 442 | 1.05 | 88.6 | 87.7 |
| EXAMPLE 9 | 20 | 406 | 438 | 1.08 | 89.0 | 88.1 |
| EXAMPLE 10 | 10 | 443 | 496 | 1.12 | 88.7 | 86.9 |
| COMPARATIVE EXAMPLE 1 | 0 | 427 | 645 | 1.51 | 88.9 | 88.0 |
| COMPARATIVE EXAMPLE 2 | 0 | 438 | 802 | 1.83 | 88.7 | 87.8 |
| COMPARATIVE EXAMPLE 3 | 0 | 439 | 764 | 1.74 | 88.8 | 87.0 |
| COMPARATIVE EXAMPLE 4 | 0 | 429 | 768 | 1.79 | 88.4 | 87.5 |
| COMPARATIVE EXAMPLE 5 | 0 | 438 | 815 | 1.86 | 89.0 | 88.1 |
| COMPARATIVE EXAMPLE 6 | 0 | 419 | 855 | 2.04 | 88.9 | 87.1 |
| COMPARATIVE EXAMPLE 7 | 0 | 467 | 869 | 1.86 | 89.1 | 87.3 |
| COMPARATIVE EXAMPLE 8 | 0 | 429 | 905 | 2.11 | 88.8 | 87.9 |
| COMPARATIVE EXAMPLE 9 | 0 | 438 | 828 | 1.89 | 88.9 | 87.1 |
| COMPARATIVE EXAMPLE 10 | 0 | 455 | 924 | 2.03 | 88.7 | 87.8 |
| REFERENCE EXAMPL 1 | — | — | — | — | 92.1 | 91.2 |

|  | VALUE BEFORE TEST/VALUE AFTER TEST | HAZE (%) BEFORE TEST | HAZE (%) AFTER TEST | VALUE BEFORE TEST/VALUE AFTER TEST | ADHESION PROPERTY BEFORE TEST | ADHESION PROPERTY AFTER TEST |
|---|---|---|---|---|---|---|
| EXAMPLE 1 | 0.99 | 1.2 | 3.6 | 2.91 | S | S |
| EXAMPLE 2 | 0.98 | 1.3 | 3.5 | 2.73 | S | S |
| EXAMPLE 3 | 0.99 | 1.3 | 3.3 | 2.52 | S | S |
| EXAMPLE 4 | 0.98 | 1.2 | 3.3 | 2.76 | S | S |
| EXAMPLE 5 | 0.99 | 1.3 | 4.1 | 3.12 | S | S |
| EXAMPLE 6 | 0.99 | 1.5 | 4.0 | 2.69 | S | S |
| EXAMPLE 7 | 0.99 | 1.2 | 3.3 | 2.71 | S | S |
| EXAMPLE 8 | 0.99 | 1.3 | 3.8 | 2.91 | S | S |
| EXAMPLE 9 | 0.99 | 1.3 | 2.9 | 2.24 | S | S |
| EXAMPLE 10 | 0.98 | 1.2 | 3.1 | 2.59 | S | S |
| COMPARATIVE EXAMPLE 1 | 0.99 | 1.3 | 3.2 | 2.44 | S | C |
| COMPARATIVE EXAMPLE 2 | 0.99 | 1.3 | 3.9 | 3.02 | S | A |
| COMPARATIVE EXAMPLE 3 | 0.98 | 1.4 | 3.8 | 2.68 | S | B |
| COMPARATIVE EXAMPLE 4 | 0.99 | 1.2 | 3.3 | 2.77 | S | A |
| COMPARATIVE EXAMPLE 5 | 0.99 | 1.3 | 3.4 | 2.61 | S | C |
| COMPARATIVE EXAMPLE 6 | 0.98 | 1.3 | 3.8 | 2.91 | S | A |
| COMPARATIVE EXAMPLE 7 | 0.98 | 1.2 | 3.8 | 3.14 | S | B |
| COMPARATIVE EXAMPLE 8 | 0.99 | 1.3 | 4.2 | 3.20 | S | C |
| COMPARATIVE EXAMPLE 9 | 0.98 | 1.3 | 3.5 | 2.69 | S | A |
| COMPARATIVE EXAMPLE 10 | 0.99 | 1.2 | 3.3 | 2.74 | S | C |
| REFERENCE EXAMPL 1 | 0.99 | 0.9 | 2.8 | 3.09 | — | — |

*THE AMOUNT OF COMPOUND 1 IS REPRESENTED BY "PARTS BY MASS" WITH RESPECT TO 100 PARTS BY MASS OF SOLID CONTENT OF PEDOT-PSS.

TABLE 2

| | RESULTS OF HEAT RESISTANCE TEST | | | | | |
|---|---|---|---|---|---|---|
| | AMOUNT OF COMPOUND 1* | SURFACE RESISTIVITY (Ω/sq) | | VALUE BEFORE | TOTAL LIGHT TRANSMITTANCE (%) | |
| | (PARTS BY MASS) | BEFORE TEST | AFTER TEST | TEST/VALUE AFTER TEST | BEFORE TEST | AFTER TEST |
| EXAMPLE 1 | 100 | 422 | 426 | 1.01 | 88.5 | 86.7 |
| EXAMPLE 2 | 90 | 441 | 459 | 1.04 | 88.8 | 87.9 |
| EXAMPLE 3 | 80 | 415 | 423 | 1.02 | 88.9 | 87.1 |
| EXAMPLE 4 | 70 | 422 | 447 | 1.06 | 89.0 | 88.1 |
| EXAMPLE 5 | 60 | 446 | 455 | 1.02 | 88.7 | 86.9 |
| EXAMPLE 6 | 50 | 423 | 461 | 1.09 | 88.8 | 87.9 |
| EXAMPLE 7 | 40 | 472 | 577 | 1.01 | 88.9 | 88.0 |
| EXAMPLE 8 | 30 | 435 | 444 | 1.02 | 88.6 | 86.8 |
| EXAMPLE 9 | 20 | 441 | 445 | 1.01 | 89.0 | 87.2 |
| EXAMPLE 10 | 10 | 438 | 451 | 1.03 | 88.7 | 87.8 |
| COMPARATIVE EXAMPLE 1 | 0 | 434 | 634 | 1.46 | 88.8 | 87.0 |
| COMPARATIVE EXAMPLE 2 | 0 | 438 | 552 | 1.26 | 88.9 | 88.0 |
| COMPARATIVE EXAMPLE 3 | 0 | 439 | 575 | 1.31 | 88.8 | 87.0 |
| COMPARATIVE EXAMPLE 4 | 0 | 429 | 639 | 1.49 | 88.7 | 86.9 |
| COMPARATIVE EXAMPLE 5 | 0 | 438 | 587 | 1.34 | 88.9 | 87.1 |
| COMPARATIVE EXAMPLE 6 | 0 | 419 | 545 | 1.30 | 88.9 | 88.0 |
| COMPARATIVE EXAMPLE 7 | 0 | 467 | 588 | 1.26 | 89.0 | 87.2 |
| COMPARATIVE EXAMPLE 8 | 0 | 429 | 532 | 1.24 | 88.8 | 87.0 |
| COMPARATIVE EXAMPLE 9 | 0 | 438 | 596 | 1.36 | 88.8 | 87.9 |
| COMPARATIVE EXAMPLE 10 | 0 | 455 | 642 | 1.41 | 88.9 | 87.1 |
| REFERENCE EXAMPL 1 | — | — | — | — | 92.1 | 91.2 |

| | VALUE BEFORE | HAZE (%) | | VALUE BEFORE | ADHESION PROPERTY | |
|---|---|---|---|---|---|---|
| | TEST/VALUE AFTER TEST | BEFORE TEST | AFTER TEST | TEST/VALUE AFTER TEST | BEFORE TEST | AFTER TEST |
| EXAMPLE 1 | 0.98 | 1.2 | 2.5 | 2.04 | S | S |
| EXAMPLE 2 | 0.99 | 1.3 | 2.8 | 2.14 | S | S |
| EXAMPLE 3 | 0.98 | 1.3 | 2.6 | 2.02 | S | S |
| EXAMPLE 4 | 0.99 | 1.2 | 2.7 | 2.26 | S | S |
| EXAMPLE 5 | 0.98 | 1.3 | 2.5 | 1.95 | S | S |
| EXAMPLE 6 | 0.99 | 1.5 | 3.1 | 2.09 | S | S |
| EXAMPLE 7 | 0.99 | 1.2 | 2.2 | 1.81 | S | S |
| EXAMPLE 8 | 0.98 | 1.3 | 2.5 | 1.92 | S | S |
| EXAMPLE 9 | 0.98 | 1.3 | 2.9 | 2.21 | S | S |
| EXAMPLE 10 | 0.99 | 1.2 | 2.2 | 1.83 | S | S |
| COMPARATIVE EXAMPLE 1 | 0.98 | 1.4 | 3.2 | 2.29 | S | C |
| COMPARATIVE EXAMPLE 2 | 0.99 | 1.3 | 2.5 | 1.95 | S | C |
| COMPARATIVE EXAMPLE 3 | 0.98 | 1.2 | 2.4 | 2.01 | S | C |
| COMPARATIVE EXAMPLE 4 | 0.98 | 1.3 | 2.6 | 1.98 | S | B |
| COMPARATIVE EXAMPLE 5 | 0.98 | 1.3 | 2.7 | 2.07 | S | B |
| COMPARATIVE EXAMPLE 6 | 0.99 | 1.2 | 2.4 | 1.99 | S | C |
| COMPARATIVE EXAMPLE 7 | 0.98 | 1.5 | 3.1 | 2.09 | S | C |
| COMPARATIVE EXAMPLE 8 | 0.98 | 1.3 | 2.6 | 1.97 | S | B |
| COMPARATIVE EXAMPLE 9 | 0.99 | 1.3 | 2.2 | 1.68 | S | C |

TABLE 2-continued

RESULTS OF HEAT RESISTANCE TEST

| COMPARATIVE EXAMPLE 10 | 0.98 | 1.4 | 2.7 | 1.91 | S | C |
|---|---|---|---|---|---|---|
| REFERENCE EXAMPL 1 | 0.99 | 0.9 | 2.8 | 3.09 | — | — |

*THE AMOUNT OF COMPOUND 1 IS REPRESENTED BY "PARTS BY MASS" WITH RESPECT TO 100 PARTS BY MASS OF SOLID CONTENT OF PEDOT-PSS.

The electroconductive coatings of Examples 1 to 10 formed from electroconductive polymer dispersion liquids containing the compound 1 exhibited small surface resistivity, large total light transmittance, small haze and excellent adhesion property even after heat resistance test or after moist-heat resistance test.

The electroconductive coatings of Comparative Examples 1 to 10 formed from electroconductive polymer dispersion liquids not containing the compound 1 exhibited large surface resistivity, small total light transmittance, large haze, and deteriorated adhesion property after heat resistance test or after moist-heat resistance test.

The invention claimed is:

1. An electroconductive polymer dispersion liquid comprising a π-conjugated electrically conductive polymer, a polyanion, a compound represented by following chemical formula (1), and a dispersion medium;

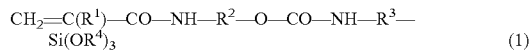

(1)

in chemical formula (1), $R^1$ represents a hydrogen atom or a methyl group, $R^2$ and $R^3$ each independently represent an arbitrary substituent group, and $R^4$ represents a methyl group or an ethyl group.

2. The electroconductive polymer dispersion liquid according to claim 1, wherein the π-conjugated electrically conductive polymer and the polyanion form a complex.

3. The electroconductive polymer dispersion liquid according to claim 2, wherein the amount of the compound with respect to 100 parts by mass of the complex is 0.01 to 300 parts by mass.

4. An electroconductive coating formed from the electroconductive polymer dispersion liquid of claim 3.

5. An electroconductive coating formed from the electroconductive polymer dispersion liquid of claim 2.

6. The electroconductive polymer dispersion liquid according to claim 1, further comprising a binder resin.

7. The electroconductive polymer dispersion liquid according to claim 6, wherein the binder resin is at least one resin selected from the group consisting of an oxetane resin, an epoxy resin and an acrylic resin.

8. An electroconductive coating formed from the electroconductive polymer dispersion liquid of claim 7.

9. An electroconductive coating formed from the electroconductive polymer dispersion liquid of claim 6.

10. The electroconductive polymer dispersion liquid according to claim 1, wherein, in the formula (1), $R^1$ is a hydrogen atom or a methyl group, $R^2$ is a methylene group, an ethylene group or a trimethylene group, $R^3$ is a trimethylene group, and $R^4$ is a methyl group.

11. An electroconductive coating formed from the electroconductive polymer dispersion liquid of claim 10.

12. The electroconductive polymer dispersion liquid according to claim 1, wherein, in the formula (1), $R^1$ is a hydrogen atom or a methyl group, $R^2$ and $R^3$ is a phenylene group, $R^4$ is a methyl group or an ethyl group.

13. An electroconductive coating formed from the electroconductive polymer dispersion liquid of claim 12.

14. The electroconductive polymer dispersion liquid according to claim 1, wherein the dispersion liquid is at least one solvent selected from the group consisting of water, an alcohol, and a polar solvent.

15. An electroconductive coating formed from the electroconductive polymer dispersion liquid of claim 14.

16. An electroconductive coating formed from the electroconductive polymer dispersion liquid of claim 1.

* * * * *